No. 75,020.
C. HURST.
CAR REPLACER.
PATENTED MAR. 3, 1868.
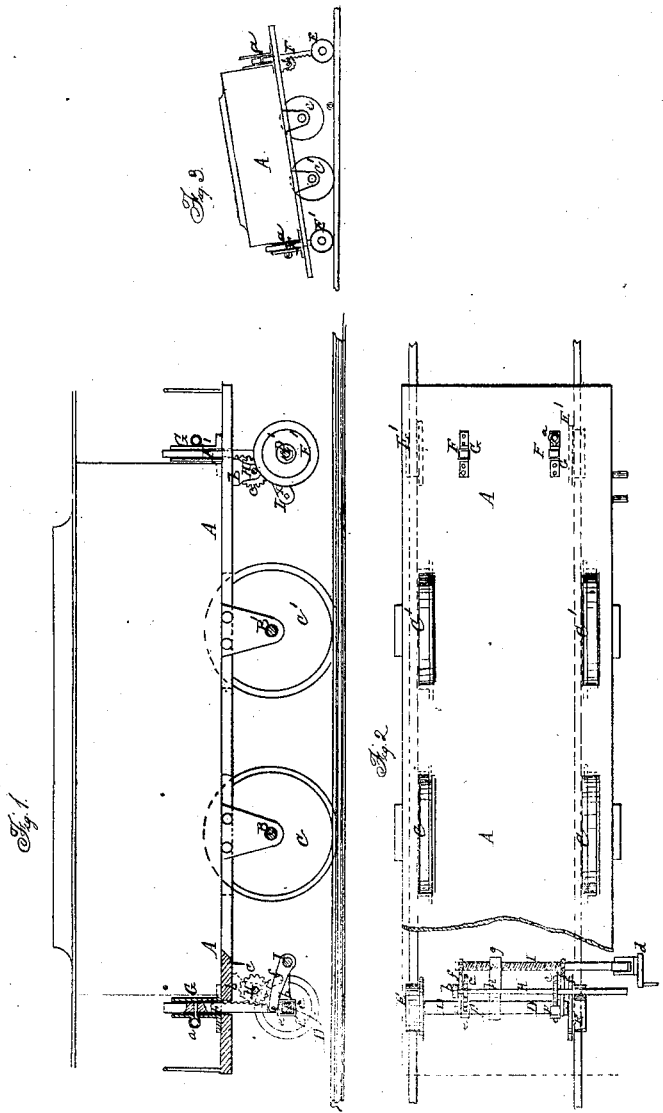

UNITED STATES PATENT OFFICE.

CHARLES HURST, OF NEW YORK, N. Y.

Letters Patent No. 75,020, dated March 3, 1868.

IMPROVED CAR-REPLACER.

*The Schedule referred to in these Letters Patent and making part of the same.*

TO ALL WHOM IT MAY CONCERN:

Be it known that I, CHARLES HURST, of the city, county, and State of New York, have invented a new and improved Car-Replacer; and I do hereby declare that the following is a full, clear, and exact description thereof, which will enable those skilled in the art to make and use the same, reference being had to the accompanying drawings, forming part of this specification, in which—

Figure 1 represents a side elevation, partly in section, of my invention.
Figure 2 is a plan or top view, partly in section, of the same.
Figure 3 is a side view, on a reduced scale, of the same.
Similar letters of reference indicate corresponding parts.

This invention relates to a new device for placing cars on track, and for raising the same over hose lying across the track, and is particularly adaptable to horse-railroad cars.

The invention consists in the attachment to each end of the car of a sideways and up-and-down adjustable axle, carrying two wheels. When a car is off the track, these axles are adjusted sideways, until their wheels are above the track, when the said axles are lowered so that their wheels come upon the track. The car is then moved on the aforesaid axles, which are held in place by the flanges of their wheels until its wheels are upon the track again. The axles are then raised and adjusted in their original positions. By lowering the axles so that their wheels stand upon the track, the ends of the car can be raised so as to raise its wheels off the track, to allow them to pass over hose lying across the track, without damaging the same.

A represents the platform of a horse or other railroad-car. B B' are its axles; C C and C' C' its wheels. D D' are two bars, to the ends of which flanged wheels E E and E' E' are respectively hung. The bars D D' are secured to vertical toothed rods F F, said rods fitting through the car-platform, as shown. Upon the car-platform are secured standards G G, one or two near each rod F. a a are pins, fitting through the standards G and rods F, to sustain the latter, and with them the axles D D', and their wheels, at a desired elevation. H H' are two horizontal axles, having their bearings in pendants b, secured to the under side of the car-platform. One axle H H' is secured near each pair of rods F, and carries pinions c c, meshing into the teeth of these rods, so that when the pins a are removed, the rods F and their appendages can be raised or lowered by turning the axles H H'. The said axles H H' are either provided with cranks or hand-wheels, or are provided with squared ends, to receive a crank-key, d, for turning the same. The axles D D' are fitted through sleeves, e, formed in the lower ends of the rods F, so that they can be moved longitudinally in their supports. To each rod F is riveted or otherwise secured a horizontally-projecting bar or plate, f, as shown in fig. 1. In the ends of the plates f, projecting from each set of rods F, is swivelled a horizontal shaft, I, which is provided with a screw-thread between the plates f, and which fits through a nut, g, secured to an arm, h, that is fixed to the shaft D D', as shown in fig. 2. Thus, as the screws I are turned by any suitable device, the axles D D' are adjusted longitudinally in their bearings, or, if the axles D D' are held firmly in place by the flanges of their wheels, when the same are on track, the rods F, and with them the whole car-platform, are adjusted on the screws. When a car runs off the track, as it is represented to be in fig. 2, the screws I I are turned until the wheels E E' are above the rails, as in fig. 2. Then the pins a a are taken out of the rods F, and the axles H are revolved, so as to raise the car. The same will then be supported on the track by the wheels E E', while the wheels C C' will be suspended above the ground. When, then, the screws I are turned, the car will be moved on the axles D D' until the wheels C C' are above the track again. The axles H are then turned again, so as to lower the car upon the track, and the rods F are fastened in their original position by the pins a. While the car is elevated on the rods F, the pins a are also inserted to keep it up. When a hose lies across a track, as in fig. 3, the front axle D or D' is lowered after it has passed beyond the hose, and the front pair of car-wheels are thereby raised off the track, as in fig. 3. The car is then drawn ahead until the front wheels C C are passed beyond the hose, when the front axle, D, is raised and the rear axle lowered, raising the rear wheels C' C' off the track, to allow them to pass over the hose. Then the rear axle, D', is raised again to its original position, as in fig. 1.

I claim as new, and desire to secure by Letters Patent—

The sliding axles D D', ratchet-bars F, axle H, having pinions c, screw-shaft I, arms f h, and nuts g, in combination with the flanged wheels E E' and car A, whereby a vertical and lateral adjustment of the flanged wheels E E' is obtained, substantially as herein shown and described, for the purpose specified.

CHARLES HURST.

Witnesses:
J. ALISON FRASER,
A. V. BRIESEN.